Patented Aug. 27, 1940

2,212,786

UNITED STATES PATENT OFFICE 2,212,786

PRODUCTION OF SULPHONYL CHLORIDES OF OLEFIN POLYMERS

David M. McQueen, Wilmington, Del., assignor to E. I. du Pont de Nemours & Company, Wilmington, Del., a corporation of Delaware No Drawing. Application May 1, 1939, Serial No. 271,199

17 Claims. (Cl. 260—513)

This invention relates to new chemical compounds and compositions. More particularly it relates to sulphonyl chlorides obtained from high molecular weight hydrocarbons, and to their hydrolysis and neutralization products. Still more particularly it relates to sulphonyl chlorides of substantially saturated monoolefin polymers and of substantially saturated diolefin polymers, said polymers having molecular weights of at least 1000 and being derived from mono- and diolefins having not more than 5 carbon atoms. The invention also relates to the hydrolysis and neutralization products of the sulphonyl chlorides of the aforesaid polymers.

This invention has for an object the production of solubilized products from high molecular weight hydrocarbons, particularly solid substantially saturated polymers derived from mono- and diolefins containing not more than 5 carbon atoms. A further object is the production of new and useful polysulphonyl chlorides from solid substantially saturated polymers of mono- and diolefins containing not more than 5 carbon atoms. A still further object is the production of hydrolyzed and neutralized products from high molecular weight hydrocarbon sulphonyl chlorides. A still further object is the preparation of tanning agents from substantially saturated solid polymers synthesized from mono- and diolefins. Still other objects will appear hereinafter.

The above and other objects are accomplished by the following invention which consists in reacting an aliphatic hydrocarbon of high molecular weight, especially a solid substantially saturated olefin polymer derived from mono- and diolefins containing not more than 5 carbon atoms, with a gaseous mixture of chlorine and sulphur dioxide. The mono- and polysulphonyl chlorides thus obtained can be hydrolyzed and neutralized to mono- and polysulphonic acids and their salts.

In carrying out the invention by one practical process a suitable polymeric aliphatic hydrocarbon is dissolved or suspended in a suitable non-reactive solvent such as carbon tetrachloride and reacted with admixed gaseous sulphur dioxide and gaseous chlorine. It is often necessary to heat the solvent in order to dissolve the hydrocarbon. This is a distinct advantage in some cases because the reaction is accelerated at elevated temperatures. In many cases it is desirable to carry out the reaction at the boiling point of the solvent because of the greater solubility of the hydrocarbon at increased temperatures. The solution of the hydrocarbon is placed in a suitable reaction vessel, preferably fitted with a gas inlet, a stirrer with a suitable seal to prevent escape of solvent, a thermometer, and a reflux condenser to return the solvent. The reaction mixture is illuminated by actinic light and heated by a suitable heater when necessary. The gases from the condenser are conducted to the hood. Chlorine and sulphur dioxide from cylinders flow separately through suitable calibrated flowmeters into a mixing flask, from which the mixture is conducted to the reaction flask and bubbled into the reaction mixture. A fair excess of sulphur dioxide to chlorine is recommended in order to enhance the solubilization characteristics and to reduce extraneous chlorination. The reaction is continued until about one part of chlorine and three parts of sulphur dioxide per one part of hydrocarbon has been used. The solvent is then distilled at reduced pressure at moderate temperatures, e. g. 50–60° C. Last traces of solvent are removed by maintaining the mixture under materially reduced pressure, e. g. 2 to 3 mm. for several hours.

The sulphonyl chlorides thus obtained which apparently consist of mono-and polysulphonyl chlorides and chlorinated mono- and polysulphonyl chlorides, predominating in polysulphonyl chlorides, can be hydrolyzed and neutralized by boiling with alkali metal hydroxide solutions to sulphonic acids and their salts. Usually a period of several hours is required and part or all of the material becomes water soluble, depending on the hydrocarbon used.

The polymeric hydrocarbons used as initial materials according to this invention may be obtained from olefins in various manners. Suitable polymers and their preparation are disclosed in U. S. Patents 2,145,350 and 2,153,553, British Patents 401,297, 421,118, 471,590, German Patent 641,284, French Patent 740,407, and in the pending application, Serial No. 157,810, filed August 6, 1937, by J. G. Paton, M. W. Perrin, and E. G. Williams. The process described in the second mentioned patent consists in subjecting ethylene to a pressure in excess of 500 atmospheres under controlled elevated temperature conditions. This procedure results in various polymers of ethylene, the molecular weight of which varies depending particularly upon the pressure employed. By using pressures of more than 1000 atmospheres, solid polymers of ethylene can be formed. Under these conditions the polymerization reaction takes place smoothly, requiring several hours for completion. Or the more rapid reaction described in the second application may be used. In this method a definite but small quantity of oxygen, which may be as little as 0.01%, but preferably 0.03% to 0.10% at 1500 atmospheres, is included in the ethylene. The pressures are at least 500 atmospheres and preferably at least 1000 atmospheres and below 3000 atmospheres. The temperatures are between 100° C. and 400° C., and more desirably from 150° C. to 250° C. The solid ethylene polymers obtained by the above-described processes will hereinafter be referred to as "polythenes".

Polythenes possess a high molecular weight ranging from 1000 upwards to 24,000 or even higher, e. g. 30,000 or 40,000; are essentially saturated products corresponding in composition substantially to $(CH_2)_x$; melt at temperatures above 100° C. and generally between about 100° C. and 120° C.; show a crystalline structure when subjected to X-ray diffraction analysis; and are soluble in xylene at its boiling point, but negligibly soluble in xylene at ordinary temperatures.

The polymeric hydrocarbons used as starting materials may also be prepared by polymerizing ethylene in the presence of a hydrogenation catalyst and an alkali metal compound of the general formula MR, wherein R is hydrogen or a hydrocarbon radical linked to the alkali metal through an aliphatic carbon atom, preferably in the presence of an inert organic solvent. This process is described more fully in the pending application, Serial No. 238,288, filed November 1, 1938, by L. M. Ellis.

The invention will be further illustrated but is not intended to be limited by the following examples in which the parts stated are parts by weight.

Example I

Twenty-five parts of ethylene polymer having a molecular weight of about 1000 (prepared according to Example VI in the pending application of L. M. Ellis, Serial No. 238,288) was suspended in carbon tetrachloride. The reaction mixture was heated to about 60° C., and gaseous chlorine and gaseous sulphur dioxide passed simultaneously into the suspension at such a rate that 64 parts of chlorine and 108 parts of sulphur dioxide entered the reaction zone over a period of 6½ hours. The carbon tetrachloride was removed by distillation at 25 to 50 mm. pressure at 50° C. The pressure was reduced to 2-3 mm. for several hours to remove the last traces of the solvent. The sulphonyl chloride product obtained analyzed: carbon 38.4%, hydrogen 5.7%, sulphur 5.1%, chlorine 47.2%. The resulting product was hydrolyzed by boiling for three hours with 10% sodium hydroxide solution to give a product which was almost completely soluble in water at room temperature.

Example II

Forty-five grams of an ethylene polymer (prepared as described in the British Patent 471,590) having a molecular weight of 10,000 to 20,000 was suspended in carbon tetrachloride in a reaction vessel which was provided with an agitator and means for illuminating the reaction zone with actinic light. Gaseous chlorine and gaseous sulphur dioxide was admixed and passed into the suspension at such a rate that 20 parts of the former and 71 parts of the latter entered the vessel over a period of two hours. The carbon tetrachloride was removed according to the method of Example I. The sulphonyl chloride product obtained analyzed: carbon 60.7%, hydrogen 9.9%, sulphur 3.8%, chlorine 18.8%. This product was hydrolyzed using 20% aqueous sodium hydroxide. The hydrolysis product in acid solution precipitated gelatin when added to aqueous solutions thereof.

Example III

Fifty parts of an isobutylene polymer having a molecular weight of about 7,000 were added to a reaction vessel containing carbon tetrachloride. The vessel was provided with a reflux condenser and means for illuminating the reaction zone with actinic light. The solution was heated to about 75° C. for about one hour to dissolve the isobutylene polymer. The temperature was reduced to 60° C. and 490 parts of gaseous sulphur dioxide and 129 parts of chlorine were passed into the solution over a period of four hours. The solvent was removed in the manner described in Example I. The product obtained analyzed: sulphur 3.2%, and chlorine 46.7%. The product was hydrolyzed with 20-30% sodium hydroxide solution. The resulting solution when acidified precipitated gelatin.

Example IV

Fifty parts of hydrogenated rubber, prepared by hydrogenating natural rubber to an average iodine number of 71.7 according to the procedure described in U. S. Patent 2,046,257, and 500 parts of carbon tetrachloride were added to a reaction vessel provided with an agitator, a reflux condenser, and means for illuminating the reacting mixture with actinic light. The mixture was heated to about 60° C. to dissolve the hydrogenated rubber and 27 parts of gaseous chlorine and 58 parts of gaseous sulphur dioxide passed into the solution over a period of 2¼ hours. The solvent was removed. The product obtained was a dark, rubbery substance containing a small percentage of combined sulphur. The product was hydrolyzed and the hydrolysis product was soluble in water.

In place of the specific starting materials set forth in the above examples, many different high molecular weight, substantially saturated hydrocarbon polymers having molecular weights of at least 1000 may be used. They may be naturally occurring or synthetically prepared, e. g., hydrogenated natural rubber, polymers derived from such monoolefins as ethylene, propylene, butylene-1, butylene-2, isobutylene, amylenes, and hydrogenated polymers from diolefins such as isopreme, butadiene, etc.

Unless the starting material is fluid at 70–90° C., the reaction is carried out in a suitable inert solvent, e. g., carbon tetrachloride and hexachloroethane. The polymer is preferably dissolved in the solvent, but if necessary the reaction can be satisfactorily carried out if the material is simply suspended in a suitable reaction medium. The concentration of the hydrocarbon in the solvent should be such that the resultant solution is fluid enough for efficient stirring. Concentration may thus vary from about 1% to as high as 40 to 50%, depending on the hydrocarbon and the solvent.

The temperature at which the reaction is carried out may be varied from room temperature up to the boiling point at 760 mm. of the solvent. A temperature of 60–70° C. is usually satisfactory. In some cases it may be desirable to use super-atmospheric pressures in order to increase the boiling point of the solvent. In no case should the pressure be increased to such a degree that the chlorine and sulphur dioxide are liquefied. The reaction is preferably carried out in the presence of actinic light, e. g., sunlight, light from an incandescent bulb, carbon arc, ultra violet lamps, infra-red lamps, or monochromatic light.

The chlorine and sulphur dioxide may be added separately and substantially simultaneously, but are preferably premixed. In the chlorine-sulphur dioxide gaseous mixture an excess of sulphur dioxide is preferably used in order to reduce the amount of extraneous chlorination. Satisfactory results may be obtained by using from 1 to as high as 15 to 20 moles of sulphur dioxide per mole of chlorine. Amounts of 3 to 6 moles of sulphur dioxide per mole of chlorine are preferred. In some cases desirable products may be obtained by only partial reaction of the hydrocarbon with the chlorine and sulphur dioxide. The preferred amounts are about one part of chlorine and three parts of sulphur dioxide per part of hydrocarbon. However, a large excess of chlorine and sulphur dioxide may often be desirable. The rate of introduction of chlorine and sulphur dioxide may be regulated as desired so as to get efficient absorption of the gases within a reasonable reaction time.

The apparatus may be made of glass, enameled vessels, or corrosion resistant alloys. Any apparatus suitable for reacting a liquid with a gas may be used. If desired the process may be carried out continuously, for example in an apparatus in which a solution of the hydrocarbon flows downward through a long tube against a counter current flow of chlorine and sulphur dioxide. Such a tube may be packed with suitable distributing media such as baffle plates, glass or nickel rings, beads, etc. Other suitable types of continuous reaction devices may be employed. Suitable equipment for recovering excess gases, including sulphur dioxide, chlorine, and hydrogen chloride, may be provided.

In hydrolyzing the sulphonyl chlorides various other alkalies can be substituted for those specified in the examples. Any alkali metal or alkaline earth hydroxide is satisfactory for this purpose and ammonium hydroxide and quaternary ammonium bases may also be used. Preferred hydrolytic agents are sodium hydroxide, potassium hydroxide, calcium hydroxide, and ammonium hydroxide. The concentration of the alkali may be varied over a wide range. Amounts from about 5% to about 40% have considerable utility. Although the hydrolysis is best carried out at about the boiling point of the hydrolytic medium, it may, if desired, be carried out at lower temperature for a longer period of time, or in some cases there may be considerable advantage in carrying out the hydrolysis at a higher temperature under pressure. The time required for the hydrolysis may vary from a few minutes to many hours.

The products of this invention are new chemically modified polymers and have a large number of uses. Thus, they may be used as modifying agents for the hydrocarbons themselves to impart improved properties thereto. They, particularly the sulphonyl chlorides, may be used as intermediates in chemical syntheses. The water soluble salts of the polysulphonic acids obtained by hydrolysis are useful as tanning agents for leather and in tanning agent baths, and are of considerable importance in this respect. They are also useful as fat liquoring agents. Chlorine and sulphonyl chloride groups are substituted at random throughout the molecule which makes the products quite complex and different from any known products.

This invention has the advantage that it provides a new and practical method of obtaining useful products from monoolefin and from hydrogenated diolefin polymers of high molecular weight. It provides an economical and easy method for obtaining polysulphonyl chlorides and polysulphonic acids from such materials.

As many apparently widely different embodiments of this invention may be made without departing from the spirit and scope thereof, it is to be understood that I do not limit myself to the specific embodiments hereof except as defined by the appended claims.

I claim:

1. A process which comprises reacting a polymer from an olefin having less than 5 carbon atoms with chlorine and sulphur dioxide substantially simultaneously.

2. A process which comprises reacting a solid olefin polymer having a molecular weight of at least 1000 with admixed gaseous chlorine and gaseous sulphur dioxide.

3. A process which comprises reacting in the liquid state a normally solid olefin polymer having a molecular weight of at least 1000 with admixed gaseous chlorine and gaseous sulphur dioxide.

4. A process which comprises reacting in the liquid phase a normally solid ethylene polymer having a molecular weight of at least 1000 with admixed gaseous chlorine and gaseous sulphur dioxide.

5. A process which comprises reacting in the liquid phase a normally solid isobutylene polymer having a molecular weight of at least 1000 with admixed gaseous chlorine and gaseous sulphur dioxide.

6. A process which comprises reacting in the liquid phase a normally solid hydrogenated rubber with admixed gaseous chlorine and sulphur dioxide.

7. A process which comprises reacting in the liquid phase a normally solid olefin polymer having a molecular weight of at least 1000 at a temperature of 60 to 70° C. with admixed sulphur dioxide and chlorine in the presence of actinic light.

8. A process which comprises reacting in an inert solvent medium a normally solid olefin polymer having a molecular weight of at least 1000 with admixed sulphur dioxide and chlorine at a temperature of 60 to 70° C.

9. A process which comprises reacting in the liquid phase a normally solid olefin polymer having a molecular weight of at least 1000 with a mixture of gaseous chlorine and gaseous sulphur dioxide and hydrolyzing the resulting product.

10. A process which comprises reacting in the liquid phase a normally solid olefin polymer having a molecular weight of at least 1000 with a mixture of gaseous chlorine and gaseous sulphur dioxide and hydrolyzing and neutralizing the resulting product with an aqueous alkali metal base.

11. The products obtainable by the process of claim 1.

12. The products obtainable by the process of claim 3.

13. The products obtainable by the process of claim 4.

14. The products obtainable by the process of claim 5.

15. The products obtainable by the process of claim 6.

16. The products obtainable by the process of claim 9.

17. The products obtainable by the process of claim 10.

DAVID M. McQUEEN.